June 17, 1941. G. A. TINNERMAN 2,246,022
METHOD OF MAKING FASTENING DEVICES
Filed Jan. 14, 1939

INVENTOR.
GEORGE A. TINNERMAN
BY Bates, Holrick, & Teare
ATTORNEYS

Patented June 17, 1941

2,246,022

UNITED STATES PATENT OFFICE 2,246,022

METHOD OF MAKING FASTENING DEVICES

George A. Tinnerman, Rocky River, Ohio, assignor, by mesne assignments, to Tinnerman Products, Inc., Cleveland, Ohio, a corporation of Ohio Application January 14, 1939, Serial No. 250,945

6 Claims. (Cl. 29—148)

This invention relates to sheet metal fasteners and a method of making the same, wherein the fastener is made of a material the thickness of which is less than the pitch of the threads of the bolt with which the fastener is intended to be used. In making such fasteners the thread engaging portion is usually formed by deforming the body, and is shaped to conform to the helix of the threads on the bolt with which it is intended to be used.

One of the problems, however, in making fasteners of this nature, is to so shape the thread engaging portion that the bolt thread will enter the space between the tongues of the fastener and bear uniformly thereagainst, engaging a relatively large area adjacent the ends of the tongues. The difficulty encountered is due to the fact that the metal, of which the fastener is made, is relatively thin, and the thread engaging portions of the fastener are yieldable with respect to the body thereof. Consequently, the thread engaging portions have a tendency to bite into the thread, and thereby to strip the threads from the bolt during the tightening operation.

The object of the present invention therefore, is to make a fastener by a method which will insure contact between the bolt thread and the thread engaging part of the fastener of the greatest area possible and yet remain within the limits of mechanical strength of the fastener.

Figure 1:
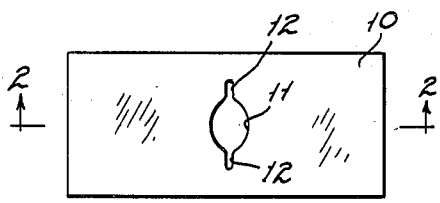
Figure 3:
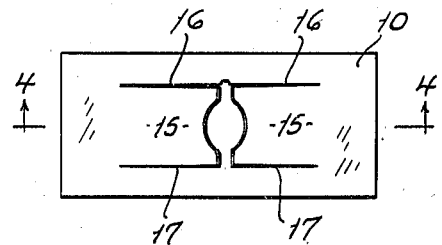
Figure 2:
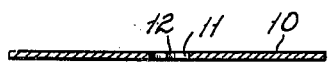
Figure 4:
Figure 5:
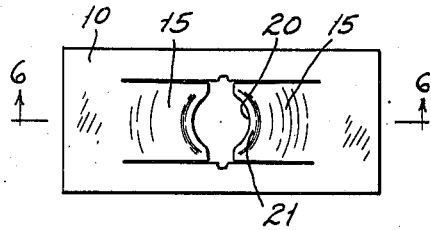
Figure 6:
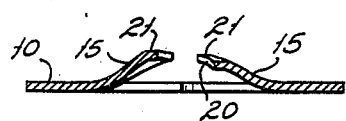
Figure 7:
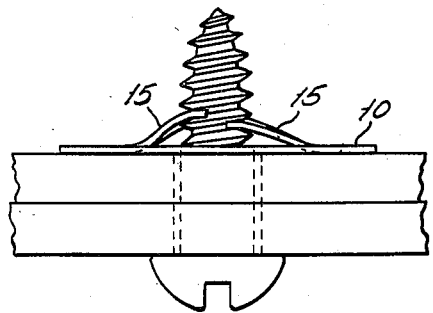

Referring now to the drawing, Fig. 1 is a top plan view of a blank that is pierced in a manner comprising the first steps in the method; Fig. 2 is a section taken on the line 2—2 in Fig. 1. Fig. 3 is a top plan view showing the next step in the method of making the fastener; Fig. 4 is a section taken on the line 4—4 in Fig. 3; Fig. 5 is a top plan view illustrating the third step in the making of the fastener; Fig. 6 is a section taken on the line 6—6 of Fig. 5; and Fig. 7 is a side view showing the use of the fastener when applied to one or more parts to be joined by means of a threaded bolt.

The fastener with which I have shown my invention is made from a strip of sheet metal, preferably of uniform width throughout its length, and of a thickness less than the pitch of the thread on the bolt with which the fastener is intended to be used.

Accordingly, as shown in Fig. 1, the strip has a body indicated at 10, which is pierced at its mid-portion to provide an irregularly shaped opening, having a substantial elliptical central portion 11 with slits 12 extending along the major axis thereof, and outwardly from each end thereof.

In Fig. 3 the next step in making the fastener is to slit the tongues 15 from the body, along lines such as 16 and 17, which preferably extend parallel to the longitudinal edges of the strip, thus making a pair of tongues that oppose each other and extend upwardly from the body of the fastener.

The third step in the formation of the fastener is to shape the tongues as shown in Fig. 6 by deflecting the ends thereof downwardly and curving them conversely so as to form the continuation of a helix which is complementary to that on the thread of the bolt with which the fastener is intended to be used. This formation changes the shape of the opening 11 (Fig. 1) to that indicated at 20 (Fig. 5) wherein the elliptical portion now appears to be substantially circular. This has been brought about by a fore-shortening action resulting from the deformation of tongues and by a twisting action that imparts a helical shape to the ends of the tongues. Thus when a bolt engages a fastener the flattened portions 21 at the ends of the tongues 15 are fitted snugly within the bolt thread and engagement is thereby made on the entire available area adjacent the ends of the tongues.

The advantage of a fastener made in accordance with the present invention is the fact that a greater holding power is obtained and that the tendency of the fastener to strip the thread is reduced to a minimum.

I claim:

1. A method of making a sheet metal fastener for threadedly engaging a bolt or screw which comprises, providing a blank, piercing it to provide noncircular thread engaging portions defining an opening smaller than the root diameter of the bolt or screw, slitting said blank with spaced slits on either side of said opening to form tongues or the like the free ends of which include said noncircular thread engaging portions, and deforming said noncircular thread engaging portions to cause the same to recede and define segments of a substantially circular thread opening for receiving the root diameter of the bolt or screw.

2. A method of making a sheet metal fastener for threadedly engaging a bolt or screw which comprises, providing a blank, piercing it to provide noncircular thread engaging portions defining an opening smaller than the root diameter of the bolt or screw, slitting said blank with spaced slits on either side of said opening to form tongues or the like the free ends of which include said noncircular thread engaging portions, deforming said noncircular thread engaging portions to cause the same to recede and define segments of a substantially circular thread opening for receiving the root diameter of the bolt or screw, and bending said tongues out of the plane of the blank to dispose said thread engaging portions on a helix corresponding substantially to the thread helix of the bolt or screw for uniform threaded engagement therewith.

3. A method of making a sheet metal fastener, comprising taking a blank, piercing it to make a substantially elliptical opening in the blank, slitting said blank with spaced slits extending in a direction substantially normal to the major axis of said opening and in the region of opposite ends of the opening to form a pair of opposed tongues, wherein the ends of said tongues constitute opposite segmental walls of such elliptical opening, subsequently warping the ends of said tongues to form a helix and at the same time bending the end portions of said tongues into a position substantially normal to the axis of the helix.

4. A method of making a sheet metal fastener, comprising taking a metallic blank, piercing it to form a closed elliptical shaped opening in the mid-portion of the blank, slitting the blank by parallel slits extending in opposite directions from the major axis of the ellipse and normal to such axis to provide tongues integral with the blank, the free ends of which carry the walls of said elliptical opening, subsequently bending the ends of said tongues to cause the end surfaces to recede from each other sufficiently to conform to a circle and warping said tongues to cause their end faces to define a helix.

5. A method of making a sheet metal fastener, comprising taking a blank, piercing it to form a closed opening the opposite sides of which are bounded by two arcs which nearly meet at their ends but are separated by narrow lateral extensions of the opening, slitting the blank by two pairs of slits each pair leading away from the lateral extensions of the opening near the ends thereof to provide two tongues the ends of which carry the original walls of the opening, then bending the tongues away from the body of the blank until projections of the arcs lie on the circumference of the same circle.

6. A method of making a sheet metal fastener for threadedly engaging a bolt or screw which comprises, providing a blank, piercing it to provide a generally elliptical opening having its minor axis smaller than the root diameter of the root diameter of the bolt or screw and defining non-circular thread engaging portions, slitting said blank with spaced slits on either side of said generally elliptical opening to form tongues or the like the free ends of which include said non-circular thread engaging portions, deforming said noncircular thread engaging portions to cause the same to recede and define segments of a substantially circular thread opening for threadedly engaging the bolt or screw, and bending said tongues out of the plane of the blank to dispose said thread engaging portions on a helix corresponding substantially to the thread helix of the bolt or screw for uniform threaded engagement therewith.

GEORGE A. TINNERMAN.